United States Patent [19]
Ebert

[11] 3,758,693
[45] Sept. 11, 1973

[54] INSTRUCTIONAL AND AMUSEMENT DEVICE
[76] Inventor: David F. Ebert, 2119 S. 5th St. Apt. 4, Minneapolis, Minn. 55404
[22] Filed: Nov. 13, 1972
[21] Appl. No.: 305,969

[52] U.S. Cl. .................. 35/8 R, 35/22 R, 35/35 E, 46/240, 273/1 M
[51] Int. Cl. ......................................... G09b 19/00
[58] Field of Search ............... 35/1, 7 A, 8 R, 22 R, 35/37, 35 E; 46/236, 237, 238, 239, 240; 273/1 M, 86 B

[56] References Cited
UNITED STATES PATENTS

| | | | |
|---|---|---|---|
| 2,311,217 | 2/1943 | Emmert | 35/22 X |
| 2,548,043 | 4/1951 | Muhlhauser | 35/35 E X |
| 2,956,807 | 10/1960 | Luchsinger | 273/1 M |
| 3,114,547 | 12/1963 | Joslyn | 273/1 M |
| 3,116,929 | 1/1964 | Kernodle | 273/1 M X |
| 3,662,077 | 5/1972 | Kersten | 35/37 |

FOREIGN PATENTS OR APPLICATIONS

| | | | |
|---|---|---|---|
| 448,133 | 6/1936 | Great Britain | 273/1 M |
| 1,136,402 | 12/1968 | Great Britain | 35/37 |

Primary Examiner—Wm. H. Grieb
Attorney—Jack W. Wicks and Bruce A. Nemer

[57] ABSTRACT

An instructional and amusement device is disclosed which, in the preferred embodiment, is in the form of a book of several pages edgewise interconnected to allow the successive turning of pages in a sequential manner. Each page includes a path having a beginning on the page, having a convoluted traversal of the page, and having an end surrounding an aperture in the page. An object having significant magnetic properties is placed at the beginning of the path, and a magnet is placed under the book-like device to thus allow the object to be moved over the path under magnetic attraction between the magnet and the object under the control of a user until the object drops into an aperture in the page and onto the next page. The then exposed page is removed and the process is repeated upon the next page.

11 Claims, 7 Drawing Figures

Patented Sept. 11, 1973

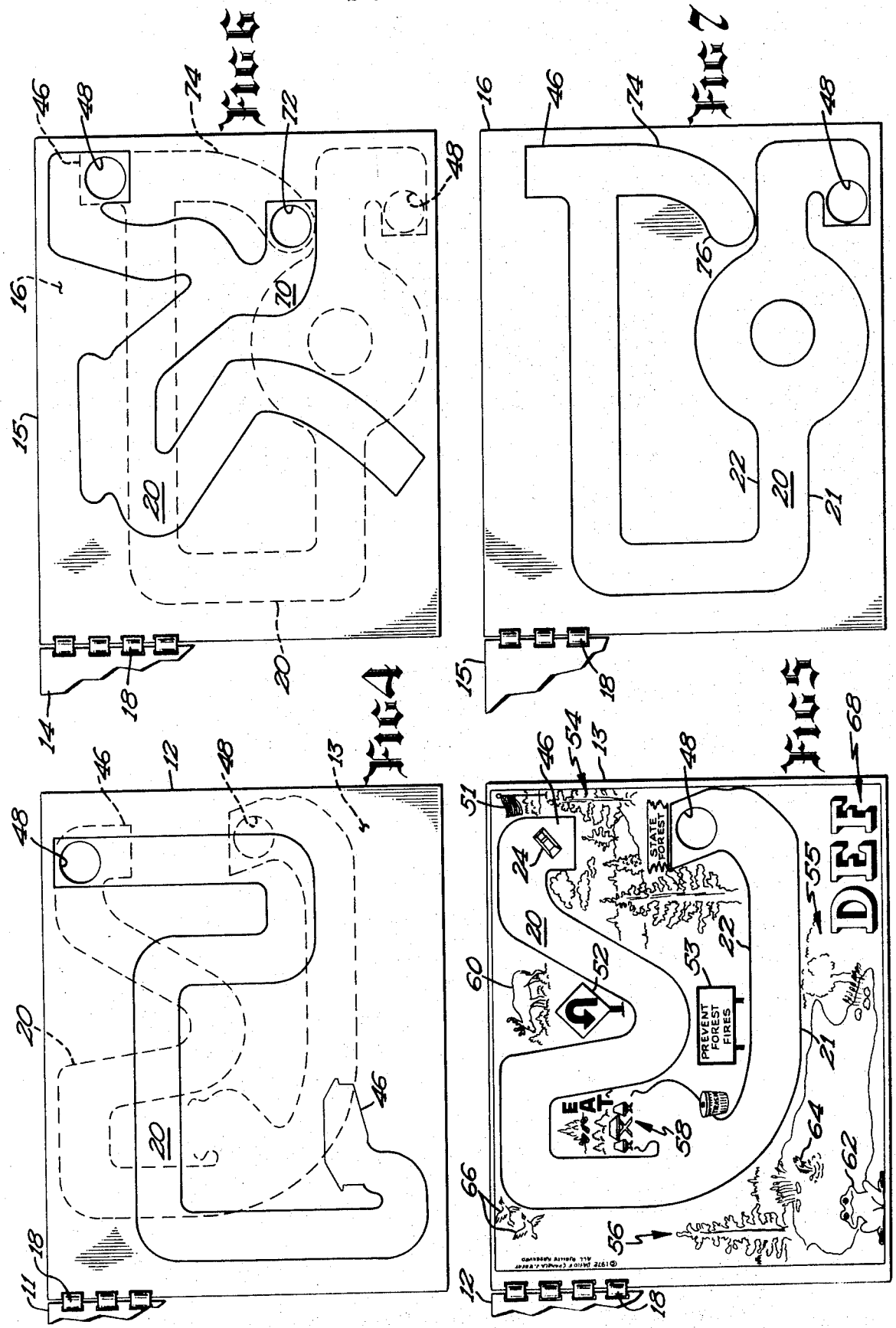

INSTRUCTIONAL AND AMUSEMENT DEVICE

BACKGROUND

This invention relates generally to instructional and amusement devices and more particularly to instructional and amusement devices using magnetic attraction.

Instructional and amusement devices which may be used to teach memory, may be used to teach motor ability, may be used to teach coordination, may be used to teach symbolic relationships, may be used to develop the imagination, may be used to teach association, may be used to teach dexterity, may be used to teach alphanumeric information, may be used in program study, and which are generally amusing are to be desired. This invention provides a device which may be used for any or all of these ends.

SUMMARY

A preferred embodiment of the present invention includes a book of edgewise interconnected pages, an object having magnetic properties, and a magnet of sufficient strength to magnetically attract the object that all of the pages and of a size which can be manipulated under the bottom surface of the book by the hand of the user. Each of the pages includes, in the preferred embodiment, a printed boundary or path of sufficient width to accommodate the object with the path leading from a starting position on the page and circuitously traversing the page to an in position surrounding an aperture through the page. A user may then manipulate the magnet under the book and through magnetic attraction move the object over the path from its beginning and to the aperture and cause the object to drop through the aperture to the next succeeding page where it is arranged that the object is received at the beginning of the next path.

Additional arrangements of paths are shown which can indicate a favored or nonfavored response by including branches leading to or from other apertures.

It is is thus an object of the present invention to provide a novel instructional and amusement device.

It is a further object of the present invention to provide such a device for teaching motor ability.

It is a further object of the present invention to provide such a device for teaching coordination.

It is a further object of the present invention to provide such a device for teaching symbolic relationships.

It is a further object of the present invention to provide such a device for developing imagination.

It is a further object of the present invention to provide such a device for developing memory.

It is a further object of the present invention to provide such a device for use in program study.

It is a further object of the present invention to provide such a device to teach dexterity.

It is a further object of the present invention to provide such a device to teach alphanumeric information.

It is a further object of the present invention to provide such a device which is operable through the use of magnetic attraction.

These and further objects and advantages of the present invention will be clearer in the light of the following detailed description of illustrative embodiments of this invention described in connection with the drawings.

DESCRIPTION OF THE DRAWINGS

FIGS. 4 and 5 are useful in explaining the interrelationship of adjacent pages.

FIGS. 6 and 7 show additional arrangements and interrelationships between adjacent pages.

Figure 1:
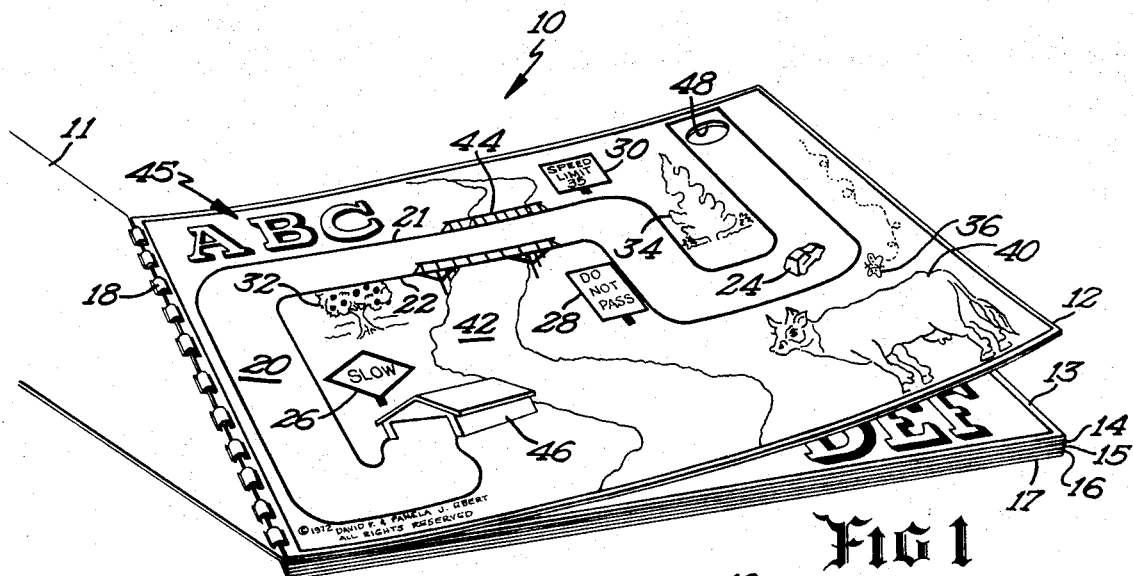
FIG. 1 shows a perspective view of a book according to the teachings of the present invention.

Where used in the various figures of the drawings, the same numerals designate the same or similar parts. Furthermore, when the terms "right," "left," "front," "back," "vertical," "horizontal," "bottom," "top," and similar terms are used herein it should be understood that these terms have reference only to the structure shown in the drawings as it would appear to a person viewing the drawings and are utilized only to facilitate describing the invention.

DESCRIPTION

In FIG. 1, a book-like device, generally designated 10, is shown having a front cover 11 and five sheets or pages, 12, 13, 14, 15, and 16 and a back cover 17. It will be realized that no requirements as to this number of pages nor the existence of a cover is intended. The sheets are shown as edgewise connected at their left side by a binding 18 which may comprise loops of plastic material conventionally available.

Page 12 is seen to include various printing thereon. In particular, a path 20 is shown on page 12 as defined by lines 21 and 22 forming boundaries of sufficient width as to accommodate an object in the form of a model of an automobile, designated 24. Object 24 is of a material having significant magnetic properties, such as soft iron, other magnetically attracted metal, or a magnet itself. Page 12 also includes various directional symbols such as highway signs 26, 28, and 30, depictions of foliage such as 32 and 34, depictions of insects, such as 36, depictions of animals, such as cow 40, depictions of a stream 42 with a bridge 44 over it, and alphanumeric information such as letters 45.

Path 20 on page 12 is arranged to start in the lower lefthand corner of the page at a starting point designated 46 and shown in the form of a building. Path 20 then winds its way in a circuitous fashion past directional sign 26 and foliage 32, past letters 45, across bridge 44 depicted as over stream 42, past signs 28 and 30, past foliage 34, cow 40, and insect 36, and to the upper righthand corner of page 12 to terminate in a round aperture 48 in the page.

Figure 3:
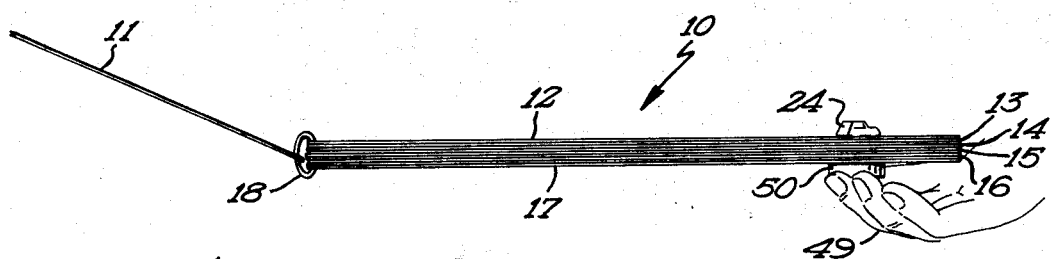
FIG. 3 shows a side view of the book of FIG. 1 along with a magnet in the hand of the user and an object manipulated by the user through use of the magnet.

FIG. 3 shows a side view of book 10 depicting a hand of a user, designated 49, manipulating a magnet 50 beneath book 10 and in magnetic attraction with object 24. Magnet 50 is of sufficient strength to magnetically attract object 24 through pages 12–17 and is further of a size which can be manipulated under back cover 17 by the hand 49 of a user.

Figure 2:
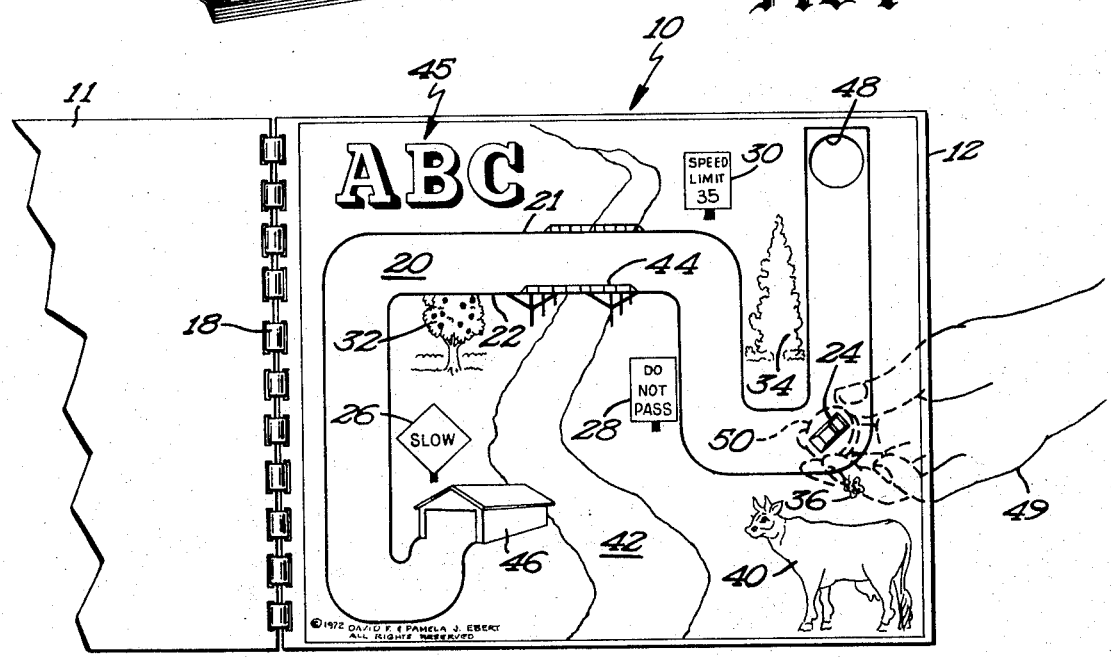
FIG. 2 shows a top view of a page of the book of FIG. 1.

FIGS. 4 and 5 show the interrelationship of page 12, as shown in detail in FIGS. 1 and 2, with the next succeeding interrelated page 13. In particular, it is seen that path 20 of page 13 includes a starting point 46 adjacent the aperture 48 of page 12 and continuing to an aperture 48 on page 13 in the same or similar manner as path 20 of page 12. Page 13 is shown in detail in FIG. 5 to include path 20, starting point 46, aperture 48, symbols 51, 52 and 53, foliage designated 54, 55, and 56, a roadside stopping area designated 58, animals designated 60, 62, 64, and 66 and alphanumeric information in the form of letters designated 68.

The remaining FIGS. 6 and 7 show some of the multitude of additional arrangements or forms which can be taken by path 20 according to the present invention. In particular, FIGS. 6 and 7 show path 20, for example, on page 15 with a provision to allow a favored and nonfavored response to be indicated by the position taken by the object dropping through a particular aperture and exposed upon the path of the next succeeding page by the removal of the previous page. That is, path 20 upon page 15 includes an aperture 48 similar to the arrangement upon page 12. Path 20 upon page 15 also includes a branch path designated 70 and terminating in an aperture 72. Branch path 70 on page 15 is shown as immediately over an alternate or nonfavored branch path 74 on page 16 having a beginning point 76.

OPERATION

The manner of operation of the instructional and amusement device of the present invention may now be explained. Briefly, a user grasps magnet 50, for example with a hand depicted as 49, and places the magnet 50 beneath back cover 17 immediately under a starting point on a particular page, such as starting point 46 on page 12 shown in FIGS. 1 and 2. Next, object 24 is placed over magnet 50 as within the structure 46 shown on page 12. By manipulating magnet 50 beneath back cover 17, the object 24 may then be moved over the top surface of page 12 under magnetic attraction between the magnet 50 and the object 24 under the control of the user. For example, the object 24 may be manipulated along path 20, as described above, until the object drops into the aperture 48 at the end of path 20 of exposed page 12 shown in FIGS. 1-3 to the surface of the next page 13 to thereby position the object 24 on the next page 13 of the interrelated pages next to sequence to the exposed page 12. Thus, the previously exposed page 12 may be removed, as by turning the page, to expose the next page 13. It can now be appreciated that object 24 is thus positioned adjacent starting point 46 of path 20 of page 13, as shown in FIG. 5.

Object 24 may then be caused to move along path 20 of page 13 by manipulating magnet 50 under back cover 17 and magnetically attracting object 24 along path 20 of page 13 in similar fashion to that accomplished on page 12. Object 24 may be thus be moved throughout and along the top surface of each of the pages of the book 10 under the control of the user until the last page is reached.

It has further been found that if printing is applied to the reverse of the pages, such as page 12 in the Figures, the book may be used in reverse. Further, it has been found that the book as shown may be used in reverse to traverse from finish to start by "hopping" the object 24 from the aperture 48. That is, it has been found that if the magnet 50 is carefully moved away from the aperture, the object 24 may be caused to "hop" out of aperture 48 and thus may be caused to traverse the path in the reverse direction.

Further, through use of multi-aperture pages such as page 15 shown in FIG. 6, a program learning book can be created where a fabored and nonfabored response can be indicated. For example, a conventional road sign may be printed at the joinder of branch path 70 and desired path 20 which would direct the user along path 20 and away from path 70, for example a turn signal. In this manner, if the user is acquainted with or learns the meaning of the symbol, i.e., in this case a signal to turn along path 20, the object 24 is manipulated to aperture 48 and to starting position 46 on page 16. A legend on page 16, such as a written commendation or a smiling face, or other can indicate to a child or to an adult that the correct decision has been made. If branch path 70 is chosen and the object traverses alternate aperture 72 to thus lie at starting position 76 on branch path 74 on page 16, an indication that this response was not correct or favored, such as a legend, frowning face, or the like can be inserted. In this manner, a programmed learning book with correct and incorrect answers can be created.

The multi-aperture pages can also be used for variations and alternate paths which would enhance the imagination building powers of a user.

Now that the basic teachings of the present invention and some extensions and variations have been explained, many further extensions and variations will be apparent to one having ordinary skill in the art. For example, while path 20 is shown as printed through the expedient of lines 21 and 22, it will be immediately apparent to one skilled in the art that path 20 may be printed by other techniques, such as by pasting, spraying, screening, and the like. As used herein, printing is deemed a generic term to all manner of application of path 20 such that a suggested direction of movement is indicated. This suggested direction may be indicated by a contrast and a border between the path and the surrounding page or other means.

Also, many types of symbols and other pictures will be envisioned as applied to particular pages.

Additionally, uses other than those set out above for the device of the present invention will be immediately envisioned by those skilled in the art. Some of those uses are books of mere symbols and no text to allow the child to develop his imagination by storytelling around the various symbols and using the device of the present invention as a test for a child having possible difficulties without the usual determinates of right and wrong. That is, a multi-choice path can be created to determine various psychological factors without attaching the "right" and "wrong" such that a child's free disposition may be measured without interference from a preconceived notion as to what is desired from him.

Further, the object 24 may be a metal object or magnet whose external configuration may be changed with the environment appearing on the particular page along which the object is moved. This may be accomplished simply by using a magnet for object 24 and a metal disc with decorations thereupon which may be placed over the magnet and adhere thereto by magnetic attraction. In this manner, an easily changeable configuration may be achieved.

Thus, since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims rather than by the foregoing description, and all changes which come within the meaning and range of equivalency of the claims are intended to be embraced therein.

What is claimed is:

1. A book-like instructional and amusement device comprising, in combination: an object formed of a material having significant magnetic properties; a plurality of interrelated sheets with each sheet having a top surface having printing thereon and a bottom surface and with each sheet having at least one aperture defined therethrough; and a magnet of sufficient strength to magnetically attract the object through the plurality of sheets and of a size which can be manipulated under the bottom surface of the sheets by the hand of a user for allowing the object to be moved over the first surface of the sheets under magnetic attraction between the magnet and the object under the control of the user until the object drops into the aperture in an exposed sheet to the surface of the next sheet to thereby position the object on the sheet of the interrelated sheets next in sequence to the exposed sheet and allow the removal of the previously exposed sheet to expose the next sheet.

2. The device of claim 1, wherein the sheets are in the form of pages of a book having a cover and a plurality of pages edgewise interconnected to allow the successive turning of pages in a sequential manner and wherein at least one aperture on each page is coordinated with the printing on the next succeeding page.

3. The device of claim 2, wherein each page after the first includes a designated path printed thereon over which the object is intended to be moved, the path extending from a starting position adjacent the aperture of a previous page and extending to the aperture on the exposed page.

4. The device of claim 3, wherein the path is in a form of a printed boundary of sufficient width to accommodate the object.

5. The device of claim 4, wherein each page includes at least two apertures coordinated with the path on the next succeeding page in a manner to allow a favored and nonfavored response to be indicated by the position taken by the object dropping through a particular aperture and exposed upon the path of the next succeeding page by the removal of the previous page.

6. The device of claim 5, including a multi-choiced path and including symbols coordinated with the path to designate a direction to be taken at each point of choice on the path.

7. The device of claim 1, wherein each sheet after the first includes a designated path printed thereon over which the object is intended to be moved, the path extending from a starting position adjacent the aperture of a previous sheet and extending to the aperture on the sheet.

8. The device of claim 7, wherein the path is in a form of a printed boundary of sufficient width to accommodate the object.

9. The device of claim 1, wherein each sheet includes at least two apertures coordinated with the path on the next succeeding sheet in a manner to allow a favored and nonfavored response to be indicated by the position taken by the object dropping through a particular aperture and exposed upon the path of the next succeeding sheet by the removal of the previous sheet.

10. The device of claim 1, including a multi-choiced path and including symbols coordinated with the path to designate a direction to be taken at each point of choice on the path.

11. The device of claim 1, including a path in the form of a printed boundary of sufficient width to accommodate the object.

* * * * *

UNITED STATES PATENT OFFICE

CERTIFICATE OF CORRECTION

Patent No. 3,758,693   Dated September 11, 1973

David F. Ebert

It is certified that error appears in the above-identified patent and that said Letters Patent are hereby corrected as shown below:

Column 1, line 42, cancel "is", (second occurrence).
Column 3, last line, delete "fabored" and substitute therefor --favored--; same line, delete "nonfabored" and substitute therefor --nonfavored--.
Column 6, claim 5, line 3, delete "the" (second occurrence) and substitute therefor --a--; line 7, delete "the" (second occurrence) and substitute therefor --a--; claim 9, lines 23 and 24, delete "the next" and substitute therefor --a next--, and line 27, delete "the next" and substitute therefor --a next--.

Signed and sealed this 1st day of January 1974.

(SEAL)
Attest:

EDWARD M. FLETCHER, JR.
Attesting Officer

RENE D. TEGTMEYER
Acting Commissioner of Patents